United States Patent [19]
Otto

[11] 4,322,093
[45] Mar. 30, 1982

[54] WHEELED WALKING AID WITH SEAT AND HAND BRAKE

[76] Inventor: Roger C. Otto, R.R. 1, Aurora, Nebr. 68818

[21] Appl. No.: 130,178

[22] Filed: Mar. 11, 1980

[51] Int. Cl.$^3$ ............................................. B62B 11/00
[52] U.S. Cl. .................................... 280/650; 188/2 F; 188/265; 280/289 WC; 280/242 WC; 297/DIG. 4
[58] Field of Search ................ 280/82.02 R, 87.02 W, 280/47.37 R, 47.25, 647, 650, 87.05, 289 WC, 242 WC; 180/19 H, 19 R, 19 S, 315, DIG. 3; 188/2 F, 29, 74, 265, 20; 74/502; 297/6, 5, 183, DIG. 4

[56] References Cited

U.S. PATENT DOCUMENTS

| | | | |
|---|---|---|---|
| 781,512 | 1/1905 | Gaines | 188/20 X |
| 906,845 | 12/1908 | Adair | 272/70.4 |
| 2,362,466 | 11/1944 | Carter | 155/22 |
| 2,626,652 | 1/1953 | Steigler | 155/22 |
| 2,745,465 | 5/1956 | Hogan | 155/23 |
| 2,792,874 | 5/1957 | Sundberg | 155/22 |
| 2,798,533 | 7/1957 | Frank | 297/6 |
| 3,256,035 | 6/1966 | Garringer | 297/6 |
| 3,354,893 | 11/1967 | Schmerl | 297/6 X |
| 3,529,700 | 9/1970 | Marshall | 188/29 X |
| 3,654,643 | 4/1972 | Clanan | 5/81 B |
| 3,968,991 | 7/1976 | Maclaren | 280/242 WC X |

FOREIGN PATENT DOCUMENTS 641856 8/1950 United Kingdom ................ 280/650

Primary Examiner—Richard A. Bertsch
Assistant Examiner—D. W. Underwood
Attorney, Agent, or Firm—Harvey B. Jacobson

[57] ABSTRACT

A wheeled frame is provided including a lower horizontal main portion having a pair of opposite side rear wheels journalled therefrom and a pair of opposite side front caster wheels. The frame includes an upstanding handle assembly supported from the rear of the lower horizontal main frame portion and the upper end of the handle assembly includes a horizontal transverse handle portion. A horizontal transverse brake bar generally parallels and is supported from the handle portion beneath the latter and is guidingly shiftable toward and away from the handle portion. A brake member is shiftably supported from the frame for movement between applied and released positions and the brake member includes wheel braking portions engageable with the rear wheels to frictionally brake the latter when the brake member is in the applied position. Connecting structure is connected between the bar and the brake member operative to shift the latter toward the applied and release positions responsive to movement of the bar toward and away from the handle portion. The frame includes a horizontal seat forward of the handle assembly and the latter and seat are forwardly and downwardly swingable toward collapsed positions relative to the lower horizontal main frame portion.

6 Claims, 5 Drawing Figures

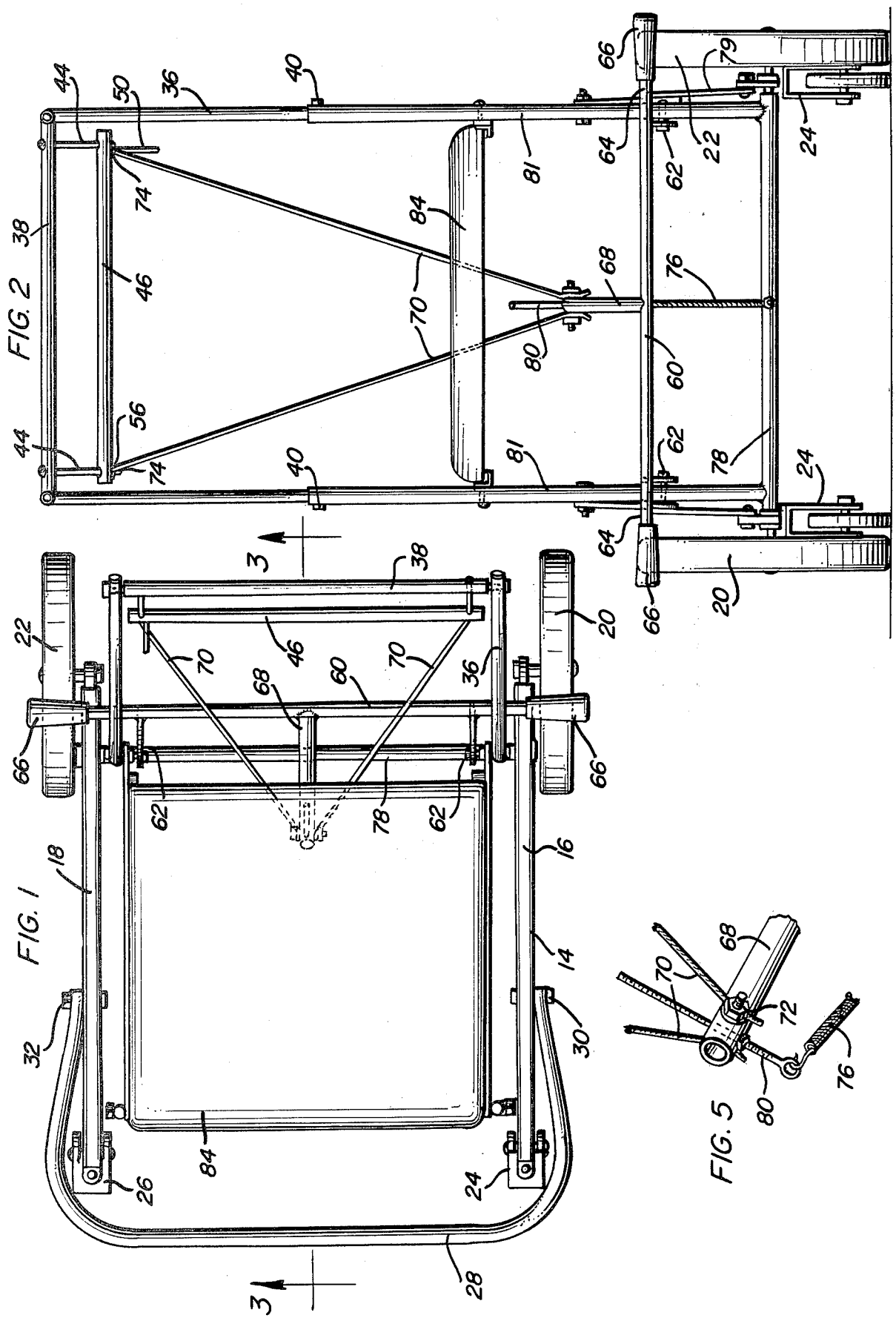

WHEELED WALKING AID WITH SEAT AND HAND BRAKE

BACKGROUND OF THE INVENTION

Various persons, because of medical problems, require the use of walking aids and many of these persons, while being able to walk with the use of a walking aid, require frequent rest periods. Accordingly, a need exists for a walking aid which may also be utilized as a seat. Although various forms of walking aids including seats heretofore have been provided such as some of the structures disclosed in U.S. Pat. Nos. 906,845, 2,362,466, 2,745,456, 2,792,874, 2,626,625, 3,256,035 and 3,654,643, many of these structures are not well suited for use by substantially all persons requiring the use of a walking aid.

BRIEF DESCRIPTION OF THE INVENTION

The main object of this invention is to provide a walking aid including features thereof which will greatly facilitate a physically handicapped person in walking from one location to another.

Yet another object of this invention is to provide a walking aid which may also be utilized as a seat by a walking person who needs frequent rests while walking.

Another important object of this invention is to provide a walking aid which may perform the function of a wheelchair.

A further object of this invention is to provide a walking aid constructed in accordance with the preceding objects and which may be readily folded into a compact state for storage as well as readily carried within a vehicle.

A final object of this invention to be specifically enumerated herein is to provide a walking aid in accordance with the preceding objects and which will conform to conventional forms of manufacture, be of simple construction and easy to use so as to provide a device that will be economical feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PRIOR ART

FIG. 1 is a top plan view of the walking aid of the instant invention;

FIG. 2 is a rear elevational view of the asemblage illustrated in FIG. 1;

FIG. 5 is a fragmentary perspective view illustrating the connecting portions by which the brake actuator is connected to the shiftable brake member.

DETAILED DESCRIPTION OF THE INVENTION

Figure 3:
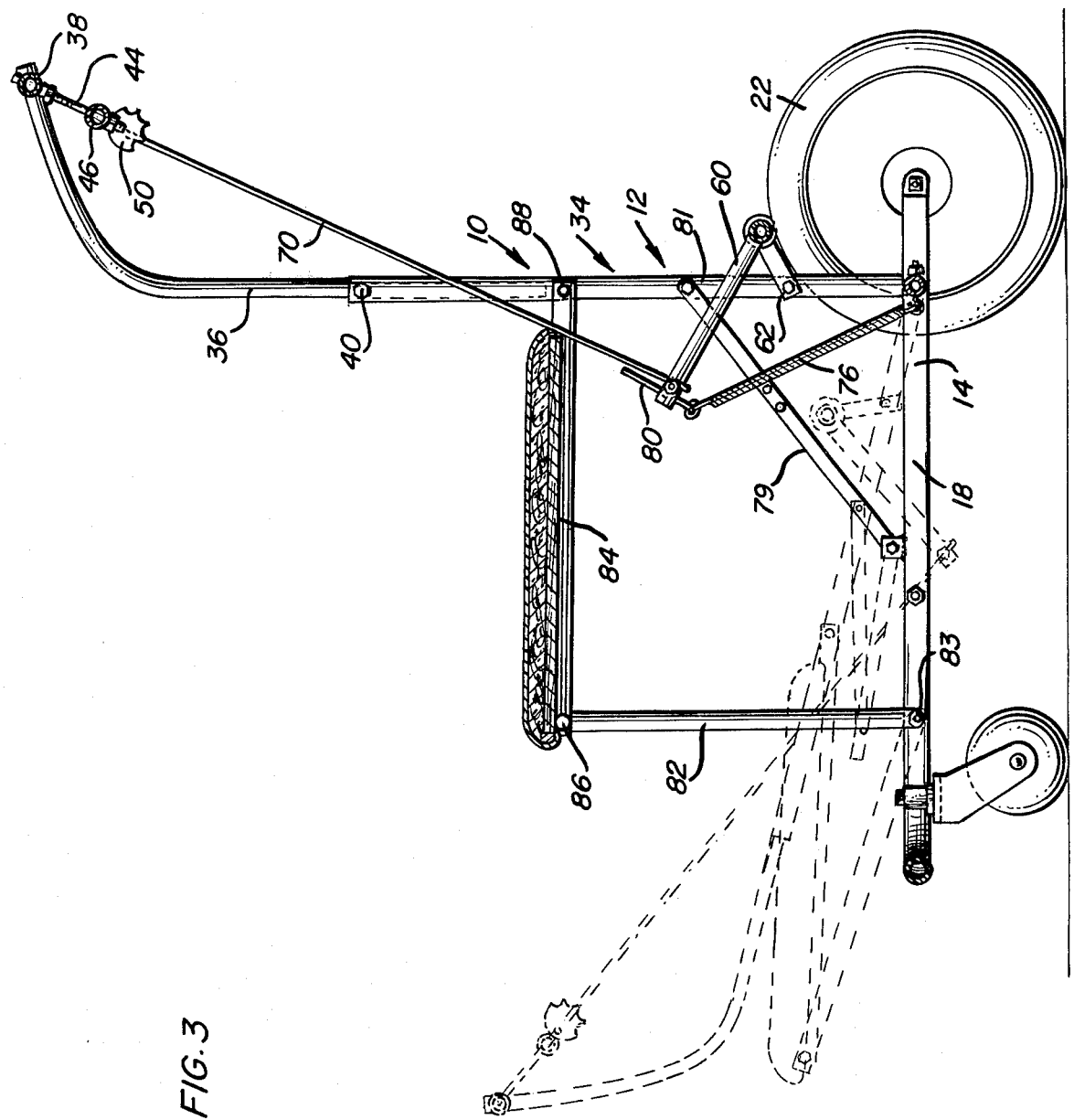
FIG. 3 is a transverse vertical sectional view taken substantially upon the plane indicated by the section line 3—3 of FIG. 1.
Figure 4:
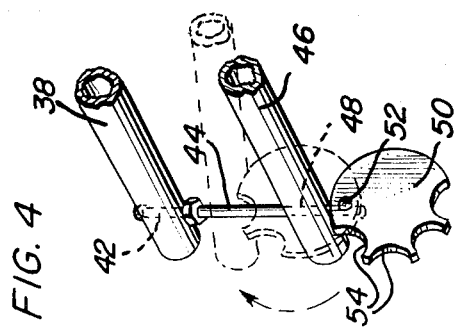
FIG. 4 is a fragmentary perspective view illustrating the manual brake latch of the walking aid.

Referring now more specifically to the drawings, the numeral 10 generally designates the walker of the instant invention. The walker 10 includes a frame assembly 12 including a lower horizontal portion 14. The lower horizontal portion 14 includes a pair of opposite side longitudinal members 16 and 18 and the rear ends of the longitudinal members 16 and 18 have rear wheels 20 and 22 journaled therefrom. The forward ends of the longitudinal members 16 and 18 have opposite side caster wheel assemblies 24 and 26 supported therefrom and the forward end of the lower horizontal frame portion 14 includes a transversely extending bumper 28 whose opposite ends are curved rearwardly and inwardly and anchored relative to the longitudinal members 16 and 18 as at 30 and 32.

An upstanding handle assembly referred to in general by the reference numeral 34 has its lower end pivotally supported from the rear ends of the longitudinal members 16 and 18 for oscillation about a horizontal transverse axis and the upper portion of the handle assembly 34 includes an upwardly extendable and downwardly retractable bail 36 including an upper horizontal transverse handle 38. The bail 36 may be secured in adjusted vertically shifted positions by set screws 40 and the opposite end portions of the handle 38 have upstanding bores 42 formed therethrough. A pair of suspension bolts 44 extend downwardly through the bores 42 and a horizontal transverse brake actuating bar 46 includes upstanding bores 48 formed through its opposite end portions. The lower ends of suspension bolts 44 are slidingly received through the bore 48 and the bar 46, which generally parallels the handle 38, is thus supported for guided movement toward and away from the handle 38.

One of the suspension bolts 44 has a disc 50 pivotally supported from its lower end as at 52 and the disc 50 includes peripherally spaced radially outwardly opening notches 54 formed therein spaced different distances from the pivot connection 52. Accordingly, the end of the bar 46 supported from the suspension bolt 44 from which the disc 50 is pivotally supported may be upwardly displaced and the disc 50 may be turned to a position with the underside of the bar 46 seated in one of the notches 54. In this manner, the bar end may be supported in a raised position. The disc 50 prevents the adjacent end of the bar 46 from sliding off the lower end of the corresponding suspension bolt 44 and the other suspension bolt 44 includes an abutment 56 thereon to prevent the corresponding end of the bar 46 from sliding downwardly therefrom.

A brake member 60 is oscillatably supported from the handle assembly 34 as at 62 and includes a pair of portions 64 in radial registry with the wheels 20 and 22 and equipped with rubber friction members 66 movable into and out of frictional engagement with the wheels 20 and 22 in order to brake the same. The brake member 60 includes an integral lever arm 68 and a pair of flexible tension members 70 are connected to opposite sides of the lever arm 68 as at 72 and to opposite ends of the bar 46 as at 74. Also, an expansion spring 76 is adjustably connected between the central portion of the lower horizontal transverse member 78 of the handle assembly 34 and the free end of the lever arm 68 by an adjustable anchor 80. Accordingly, upward movement of the bar 46 toward the handle 38 is operative to cause the friction members 66 to engage the periphery of the wheels 20 in order to brake the walking aid 10.

Articulated brace assemblies 79 are interconnected between opposite sides of the lower handle assembly portions 81 and the corresponding longitudinal members 16 and 18 and may be utilized to brace the handle assembly 34 in the upright position thereof illustrated in FIG. 3 of the drawings.

In addition, the walker 10 includes a forward upright support 82 whose lower end is pivotally anchored to the forward end portions of the longitudinal members 16 and 18 as at 83 and a horizontal seat assembly 84 has its front and rear portions pivotally attached as at 86 and 88 to the upper end of the upright support 82 and the vertical midportion of the handle assembly 34 as at 88. Thus, the seat assembly 84 forms a part of a parallelogram linkage assembly also including the upright support 82, the handle assembly 34 and the lower horizontal portion 14 of the frame 12. When the articulated braces 78 are released, the handle assembly 34, upright support 82 and seat assembly 34 may be swung forwardly and downwardly to the positions thereof illustrated in phantom lines in FIG. 3 of the drawings in order to render the walker 10 more compact for storage and ease of transport within a vehicle.

The bail 36 of the handle assembly 34 is vertically adjustable to accommodate different heights of persons using the walker 10 and adjustment of the cables 70 is effected for the necessary brake adjustment when the adjustment of the bail 36 is changed.

A person using the walker 10 may walk there behind with his or her hands on the handle 38 and at least one of his hands also engaging the corresponding end of the bar 44. If it is necessary to brake the walker 10, that end of the bar 44 is merely squeezed upwardly toward the corresponding end of the handle 38. If it is desired, the persons using the walker 10 may rest themselves by being seated on the seat assembly 84, but the disc 50 will first be utilized to lock the rear wheels 20 of the walker 10. In this manner, a person may be seated on the walker 10 even on inclined ground without fear of danger. It is pointed out that by using a pair of flexible tension members 70 operatively connected between the opposite ends of bar 46 and the free end of arm 68 either bar end may be raised to "apply the brakes." Also, both bar ends may be raised.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wheeled walking aid including a frame defining a lower horizontal main portion having front and rear ends, a pair of rear opposite side wheels journaled from said rear end for rotation about a horizontal transverse axis, a pair of front opposite side caster wheels supported from opposite side of said front end, said frame including an upstanding handle assembly supported from said rear end and including an upper horizontal transverse handle portion, a horizontal transverse brake bar generally paralleling and supported from said handle portion beneath and guidingly shiftable toward and away from the latter and being sufficiently close to said handle portion to be gripped by a person's hand engaged with said handle portion and drawn theretoward by a hand squeezing action, a brake member shiftably supported from said frame for movement between applied and released positions, said brake member including a pair of spaced wheel braking portions engageable with corresponding rear wheels to frictionally brake the latter when said brake member is in said applied position, and connecting means connected between said bar and said brake member operative to shift the latter toward said applied and released positions responsive to movement of said bar toward and away from said handle portion, said connecting means including means operatively connecting each end of said bar to said brake member for actuation of the latter to the applied position in response to movement of either end of said bar toward the corresponding end of said handle portion.

2. The combination of claim 1 including a forward upstanding support whose lower end is pivotally anchored relative to said main portion forward end for swinging about a horizontal axis extending transversely of said frame and the lower end of said handle assembly being similarly pivotally anchored relative to said main portion rear end, a generally horizontal seat structure including front and rear portions pivotally anchored relative to upper portions of said support and handle assembly with said support and handle assembly disposed in substantial parallel relation, said seat and the upper portions of said support and handle assembly being forwardly and downwardly swingable relative to said main frame portion toward collapsed positions relative thereto, and brace means operatively connected between said handle assembly and said main frame portion releasably securing the latter in an upright position.

3. The combination of claim 1 wherein said handle portion includes opposite end depending guides, the opposite ends of said bar being slidingly and guidingly supported from said guides for movement therealong, an upwardly opening V-shaped bridle anchored at its upper free divergent arm ends to the opposite ends of said bar, said brake member including a portion thereof centrally located transversely of said main lower frame portion and shiftable upwardly and downwardly responsive to brake member to said applied and released positions, respectively, and the lower portion of said bridle being anchored relative to said centrally located portion.

4. A wheeled walking aid including a frame defining a lower horizontal main portion having front and rear ends, a pair of rear opposite side wheels journaled from said rear end for rotation about a horizontal transverse axis, a pair of front opposite side caster wheels supported from opposite side of said front end, said frame including an upstanding handle assembly assembly supported from said rear end and including an upper horizontal transverse handle portion, a horizontal transverse brake bar generally paralleling and supported from said handle portion beneath and guidingly shiftable toward and away from the latter and being sufficiently close to said handle portion to be gripped by a person's hand engaged with said handle portion and drawn theretoward by a hand squeezing action, a brake member shiftably supported from said frame for movement between applied and released positions, said brake member including wheel braking portions engageable with said rear wheels to frictionally brake the latter when said brake member is in said applied position, and connecting means connected between said bar and said brake member operative to shift the latter toward said applied and released positions responsive to movement of said bar toward and away from said handle portion, said handle portion including opposite end depending guides, the opposite ends of said bar being slidingly and guidingly supported from said guides for movement therealong, said connecting means including an upwardly opening V-shaped bridle anchored at its upper free divergent arm ends to the opposite ends of said bar, said brake member including a portion thereof centrally located transversely of said main lower frame portion and shiftable upwardly and downwardly responsive to brake member to said applied and released positions, respectively, and the lower portion of said bridle being anchored relative to said centrally located portion, the lower end of one of said guides including a locking disc pivotally supported therefrom for rotation about an axis generally paralleling said handle portion, the periphery of said disc including radially outwardly opening notches formed therein in which the corresponding end of said bar is seatingly receivable, said notches being spaced about the last mentioned axis and spaced different radial distances therefrom.

5. A brake actuator for a wheeled vehicle including an elevated horizontal handle and a brake member portion shiftable back and forth relative to said handle between applied and released positions, laterally projecting guides carried by the opposite ends of said handle, an elongated transverse bar having opposite ends guidingly supported from said guides for movement therealong toward and away from said handle, and a pair of elongated flexible tension members having one pair of ends anchored relative to said brake member portion and the other pair of ends anchored relative to the opposite ends of said bar, the outer end of one of said guides including a locking disc pivotally supported therefrom for rotation about an axis generally paralleling said handle, the periphery of said disc including radially outwardly opening notches formed therein in which the corresponding end of said bar is seatingly receivable, said notches being spaced about the last mentioned axis and spaced different radial distances therefrom.

6. The combination of claim 5 wherein said brake member portion is disposed below said handle and bar centrally intermediate the opposite ends of said bar, said laterally outwardly projecting guides being dependingly supported from the opposite ends of said handle.

* * * * *